United States Patent
Kieser

(10) Patent No.: US 9,211,788 B2
(45) Date of Patent: Dec. 15, 2015

(54) METHOD FOR DIAGNOSING AN OPERATING STATUS OF A DRIVE DEVICE, AND DIAGNOSTIC DEVICE AND DRIVE SYSTEM

(75) Inventor: Joerg Kieser, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 934 days.

(21) Appl. No.: 12/998,149

(22) PCT Filed: Sep. 14, 2009

(86) PCT No.: PCT/EP2009/061865
§ 371 (c)(1),
(2), (4) Date: Jun. 1, 2011

(87) PCT Pub. No.: WO2010/034637
PCT Pub. Date: Apr. 1, 2010

(65) Prior Publication Data
US 2011/0224853 A1    Sep. 15, 2011

(30) Foreign Application Priority Data
Sep. 24, 2008  (DE) .......................... 10 2008 042 307

(51) Int. Cl.
*B60W 10/02* (2006.01)
*B60K 6/48* (2007.10)
*B60W 10/06* (2006.01)
*B60W 10/08* (2006.01)
*B60W 50/04* (2006.01)

(52) U.S. Cl.
CPC .................. *B60K 6/48* (2013.01); *B60W 10/02* (2013.01); *B60W 10/06* (2013.01); *B60W 10/08* (2013.01); *B60L 2240/421* (2013.01); *B60L 2240/441* (2013.01); *B60L 2240/445* (2013.01); *B60W 50/04* (2013.01); *B60W 2510/0241* (2013.01); *B60W 2510/0619* (2013.01); *B60W 2510/0638* (2013.01); *B60W 2510/0676* (2013.01); *B60W 2510/081* (2013.01); *B60W 2510/244* (2013.01); *B60W 2710/027* (2013.01); *B60W 2710/0644* (2013.01); *B60W 2710/081* (2013.01); *Y02T 10/6221* (2013.01); *Y02T 10/6286* (2013.01); *Y02T 10/642* (2013.01)

(58) Field of Classification Search
CPC ...... B60W 10/02; B60W 10/04; B60W 10/05
USPC ............... 701/22; 180/65.21, 65.265, 65.275, 180/65.28, 65.285
See application file for complete search history.

(56) References Cited

U.S. PATENT DOCUMENTS

| | | | |
|---|---|---|---|
| 2002/0019294 A1* | 2/2002 | Yamazaki et al. | 477/169 |
| 2004/0084234 A1* | 5/2004 | Yatabe et al. | 180/65.2 |
| 2006/0137921 A1 | 6/2006 | Colvin et al. | |

FOREIGN PATENT DOCUMENTS

| | | |
|---|---|---|
| EP | 1 418 079 | 5/2004 |
| EP | 1 914 101 | 4/2008 |
| WO | WO 2008/068930 | 6/2008 |

*Primary Examiner* — Thomas G Black
*Assistant Examiner* — Peter D Nolan
(74) *Attorney, Agent, or Firm* — Kenyon & Kenyon LLP

(57) ABSTRACT

In a method for diagnosing an operating status of a drive device in a drive system of a motor vehicle having at least two drive devices configured as an electric machine and an internal combustion engine, and having at least one separating clutch which couples the drive devices in an adjustable way, setpoint rotational speeds of the drive devices are set to predetermined values and the operating status is determined from the resulting actual rotational speed of the one drive device.

13 Claims, 4 Drawing Sheets

METHOD FOR DIAGNOSING AN OPERATING STATUS OF A DRIVE DEVICE, AND DIAGNOSTIC DEVICE AND DRIVE SYSTEM

BACKGROUND OF THE INVENTION

1. Field of the Invention

The present invention relates to a method for diagnosing an operating status of a drive device in a drive system, in particular of a motor vehicle, having at least two drive devices, in particular an electric machine and an internal combustion engine, and at least one separating clutch, which couples the drive devices in an adjustable way. Furthermore, the present invention relates to a diagnostic device and a drive system.

2. Description of Related Art

Drive systems having multiple drive devices which may be coupled in an adjustable way with the aid of at least one separating clutch may be operated in various operating modes. For example, operation using only one of the drive devices may be provided, but also, on the other hand, by engaging the separating clutch, operation using multiple drive devices may be provided. Such drive systems are frequently designed as hybrid drive systems, i.e., they have at least two different drive devices. In most cases, an internal combustion engine and an electric machine are selected. In such hybrid drive systems, an energy storage of the electric machine is charged, in that the electric machine is operated as a generator and is driven by the internal combustion engine. When the vehicle is operated in a hybrid operating mode, and the separating clutch is thus engaged, i.e., the drive devices are coupled, both the internal combustion engine and also the electric machine are coupled to a drivetrain of the motor vehicle. In this operating mode, it currently may not yet be recognized whether the internal combustion engine actually delivers a positive torque. If the torque of the internal combustion engine drops out—for example, due to a defect in the system, for example, in the event of failure of the ignition—it is compensated for by a regulating device of the drive system with the aid of the electric machine. The energy storage is discharged, since generator operation of the electric machine may no longer be performed. If a driver of the motor vehicle does not notice that the internal combustion engine is no longer in operation, the motor vehicle may unexpectedly fail for him. Methods for diagnosing the operating status of an individual drive device in a drive system have heretofore rarely been performed, since a measurement of the torque generated by the internal combustion engine or the drive torque jointly generated by the internal combustion engine and the electric machine requires additional measuring devices and is therefore costly.

BRIEF SUMMARY OF THE INVENTION

The method for diagnosing the operating status of the drive device in the drive system has the advantage over the related art that it does not require determination of the actually generated torques of the drive devices and is therefore cost-effectively implementable. Deep intervention in existing control systems of the drive system is also not necessary. This is achieved in that setpoint rotational speeds of the drive devices are set to predetermined values and the operating status is determined from the resulting actual rotational speed of the one drive device.

It is thus the object of the present invention to determine the operating status of one of the drive devices in a drive system in which multiple drive devices are provided. For example, the drive system may be a hybrid drive system which has at least two different drive devices, for example, an electric machine and an internal combustion engine. The drive devices of the drive system may be coupled in an adjustable way via at least one separating clutch. Preferably, two drive devices are connected so they may be coupled with the aid of a separating clutch. For example, the drive system may be a parallel hybrid drive system in which the internal combustion engine is connected via a separating clutch to the electric machine and the electric machine is connected via a starting clutch to a drivetrain of the motor vehicle.

The electric machine may be operated in both motor operation and also generator operation. This means that the electric machine may be driven by the internal combustion engine and therefore generates power, which is stored in an energy storage. It is also possible that the energy stored in the energy storage is used to operate the electric machine, for example, it is operated in purely electrical driving operation, i.e., with the separating clutch disengaged, or in a supporting operation, in which the torque of the electric machine supplements that of the internal combustion engine. If the drive devices are coupled to one another via the separating clutches it is not possible to establish whether an individual one of the drive devices delivers a positive torque. Only a total drive torque may be established, which is applied to the drivetrain of the motor vehicle and is used to accelerate or decelerate the motor vehicle. This circumstance is given by the control/regulation of the drive system, which frequently does not permit monitoring of the individual drive devices. However, it is possible to establish the operating status of one of the drive devices, in that the drive devices are set to setpoint rotational speeds and subsequently the resulting actual rotational speed is monitored. For this purpose, a device, which allows the determination of the particular rotational speeds of the drive devices, is to be provided at least on the one drive device and at least on a further drive device which is coupled to the one drive device. Therefore, both the rotational speed of the one drive device and also the rotational speed of the at least one further drive device are to be determined.

One refinement of the present invention provides that, for performing the diagnosis, a holding torque of the separating clutch is set in such a way that no slipping occurs in the event of equal rotational speeds and slipping of the separating clutch occurs in the event of different rotational speeds. The holding torque of the separating clutch is thus constantly set to an instantaneous torque which is applied to the separating clutch. For example, the holding torque is determinable on the basis of the instantaneous rotational speed from a model or a table. The setting of the separating clutch is performed in such a way that in particular no slipping occurs, for example, no slip of the separating clutch occurs. This is true as long as the drive devices have equal rotational speeds. However, if different rotational speeds exist, slipping of the separating clutch is to occur, i.e., slip may exist. The diagnosis may be performed, for example, in such a way that initially the drive devices are set to the same setpoint rotational speed, the holding torque of the separating clutch is adapted according to this setpoint rotational speed, and subsequently different setpoint rotational speeds are assigned to the drive devices. If no slip occurs in the event of equal setpoint rotational speeds, however, slip does occur in the event of different setpoint rotational speeds, it may be assumed that the one drive device operates faultlessly. This is true in particular when the actual rotational speed of the drive device reaches the setpoint rotational speed. It is thus possible in this way to establish whether the one drive device is in operation.

One refinement of the present invention provides that a rotational speed regulation/control system, on which the setpoint rotational speed is set, is assigned to each drive device. Each drive device thus has a separate rotational speed regulation/control system, which regulates and/or controls the rotational speed of the drive device. The setpoint rotational speed may be set on these rotational speed regulation/control systems, whereby the drive device is regulated and/or controlled in such a way that an actual rotational speed results, which at least essentially corresponds to the setpoint rotational speed.

One refinement of the present invention provides that the rotational speed regulation/control systems are set in normal operation by a higher-order rotational speed regulation/control system or the drive devices are regulated and/or controlled with the aid of the higher-order rotational speed regulation/control system. It may thus be provided that a higher-order rotational speed regulation/control system is provided in addition to the rotational speed regulation/control systems of the drive devices. In normal operation, i.e., in operation in which diagnosis of the operating status is not performed, this higher order system may set the rotational speed regulation/control systems assigned to the drive devices. In this way, for example, the same setpoint rotational speed may be assigned to all rotational speed regulation/control systems or drive devices. However, it may also be provided that the higher-order rotational speed regulation/control system directly regulates and/or controls the drive devices in normal operation, i.e., without addressing or setting the rotational speed regulation/control systems of the drive devices. Alternatively, it may also be provided that the drive devices are regulated and/or controlled by the higher-order rotational speed regulation/control system both in normal operation and also during the diagnosis of the operating status.

One refinement of the present invention provides that the rotational speeds of the drive assemblies are lowered before the diagnosis is performed. Before the diagnosis is performed, the rotational speeds of the drive assemblies are reduced, i.e., the setpoint rotational speeds are set to a lower value. This reduces the energy input into the separating clutch, since slipping of the separating clutch may occur at least briefly during the diagnosis of the operating status, as described above. The lower the rotational speeds of the drive assemblies, the lower the energy input into the separating clutch, whereby its service life is lengthened. Above all, the setpoint rotational speeds of the drive assemblies are to be reduced. However, it may also be provided that the actual rotational speeds of the drive assemblies are monitored until the actual rotational speeds essentially correspond to the (lower) setpoint rotational speeds. The diagnosis of the operating status is only performed subsequently thereto.

One refinement of the present invention provides that the setpoint rotational speed of the one drive device is increased or reduced in relation to the one further drive device. The further drive device is coupled with the aid of the separating clutch to the one drive device. To perform the diagnosis, the setpoint rotational speed of the one drive device is increased or reduced, so that the setpoint rotational speed of the one drive device is higher or lower than that of the further drive device. If the actual rotational speed of the one drive device reaches the set setpoint rotational speed, it may be assumed therefrom that the one drive device is operational.

One refinement of the present invention provides that the separating clutch is disengaged to perform the diagnosis. As an alternative to adjusting the separating clutch in such a way that there is initially no slipping and slipping initially occurs in the event of different rotational speeds of the drive assemblies, the separating clutch may be completely disengaged to perform the diagnosis. However, the separating clutch is engaged before the diagnosis is performed. This means that before the diagnosis is performed, the one drive device and the further drive device, which may be coupled in an adjustable way to the one drive device via the separating clutch, are operationally linked, so that both drive devices have the same rotational speed. This is also the case if the one drive device is non-operational, since it is then in drag operation of the further drive device and is driven thereby. The performance of the diagnosis occurs via the disengagement of the separating clutch. If the actual rotational speed of the one drive device subsequently deviates from its setpoint rotational speed, in particular downward, it may be assumed that the drive device is non-operational, but rather an error is present. A predetermined tolerance range is taken into consideration, so that deviations of the actual rotational speed from the setpoint rotational speed within the tolerance range are permissible. In this way, since the rotational speeds of the drive devices also frequently slightly vary during proper operation, false diagnostic results are avoided. If the diagnosis is performed by disengaging the separating clutch, the additional energy input therein is avoided, so that the service life of the separating clutch is not impaired. Performing the method is therefore fundamentally possible at any setpoint rotational speed.

One refinement of the present invention provides that an idle rotational speed is used as the setpoint rotational speed. For example, the drive devices may be set to a system idle rotational speed, which is reachable by both the one drive device and also the further drive device without restrictions of the functionality. The rotational speed regulation/control systems may thus be idle rotational speed regulation/control systems, or the higher-order rotational speed regulation/control system may be a higher-order idle rotational speed regulation/control system.

One refinement of the present invention provides that it is performed during operation of the drive system having multiple drive devices. The torque delivered by the drive system is thus to be composed of torques of multiple drive devices or jointly generated thereby. This means that the separating clutches between these multiple drive devices, but not necessarily between all drive devices, are engaged. For example, this may be performed during hybrid operation of the drive system, which is then designed as a hybrid drive system. For example, the electric machine is coupled via the separating clutch to the internal combustion engine and is further connected via the starting clutch to the drivetrain of the motor vehicle.

One refinement of the present invention provides that the diagnosis is performed after an error suspicion signal has occurred. The diagnosis of the operating status of the drive device is therefore only performed if an error suspicion already exists, i.e., it is assumed that the one drive device is possibly non-operational.

One refinement of the present invention provides that the error suspicion signal occurs due to a charge balance of an energy storage, a signal of an exhaust gas sensor, and/or an analysis of a temperature/heat balance of the one drive device. Therefore, various ambient conditions of the drive system are analyzed. For example, the charge balance of the energy storage may be observed and the error suspicion signal may be triggered as soon as the charge state drops in spite of a charge request to the drive device, for example, in the form of the electric machine. It may be assumed in this case that in spite of the charge request, no charging is performed and the drive device is therefore possibly non-operational. The signal of the exhaust gas sensor may also be analyzed. For example, this signal is provided in the form of a lambda signal, whereby the error suspicion signal is triggered as soon as the signal indicates a lean exhaust gas of the internal combustion engine, although there is no overrun shutoff or cylinder shutoff of the internal combustion engine. The temperature and/or the heat balance of the one drive device may also be analyzed. If the temperature is too low or if there is no heating of the one drive device over a predetermined period of time, the error suspicion signal is triggered.

One refinement of the present invention provides that before the diagnosis of the operating status is performed, a diagnosis of the separating clutch is performed and/or the separating clutch diagnosis is temporarily shut off during its performance. Before the operating status of the one drive device is diagnosed, the separating clutch is thus to be checked for its function. In this way, it may be ensured that the operating status of the one drive device may be reliably determined and is not influenced by a possible malfunction of the separating clutch. This means that before the diagnosis of the one drive device is performed, the diagnosis of the separating clutch or of a separating clutch system must definitely be completed without error. Furthermore, it is advantageous if the separating clutch diagnosis is temporarily shut off during the diagnosis of the one drive device. During this diagnosis, a rotational speed difference may occur at the separating clutch, which would incorrectly be evaluated as an error by a separating clutch diagnosis system. This is to prevent an error which relates to the separating clutch from being indicated due to the diagnosis of the operating status of the drive device.

One refinement of the present invention provides that a result of the diagnosis is indicated to a driver of the motor vehicle. If a result of the diagnosis of the operating status of the drive device is provided, it is indicated to the driver of the motor vehicle, in particular if it is established that the one drive device is non-operational. This may be carried out visually (using a signal light) or acoustically (using a warning tone), for example. In this way, the driver may take appropriate measures to avoid a breakdown of the motor vehicle, for example, by visiting a repair shop.

Furthermore, the present invention relates to a diagnostic device for diagnosing an operating status of a drive device, in particular for performing the method according to the preceding embodiments, in a drive system, in particular of a motor vehicle, the drive system having at least two drive devices, in particular an electric machine and an internal combustion engine, and at least one separating clutch which couples the drive devices in an adjustable way. It is provided that the setpoint rotational speeds of the drive devices are settable to predetermined values and the operating status is determinable from the resulting actual rotational speed of the one drive device. The diagnostic device may be refined according to the preceding embodiments.

Furthermore, the present invention relates to a drive system, in particular of a motor vehicle, and in particular having a diagnostic device and/or for performing the method according to the preceding embodiments, having at least two drive devices, in particular an electric machine and an internal combustion engine, and at least one separating clutch which couples the drive devices in an adjustable way. It is provided that the setpoint rotational speeds of the drive devices are settable to predetermined values and the operating status is determinable from the resulting actual rotational speed of the one drive device.

DETAILED DESCRIPTION OF THE INVENTION

Figure 1:
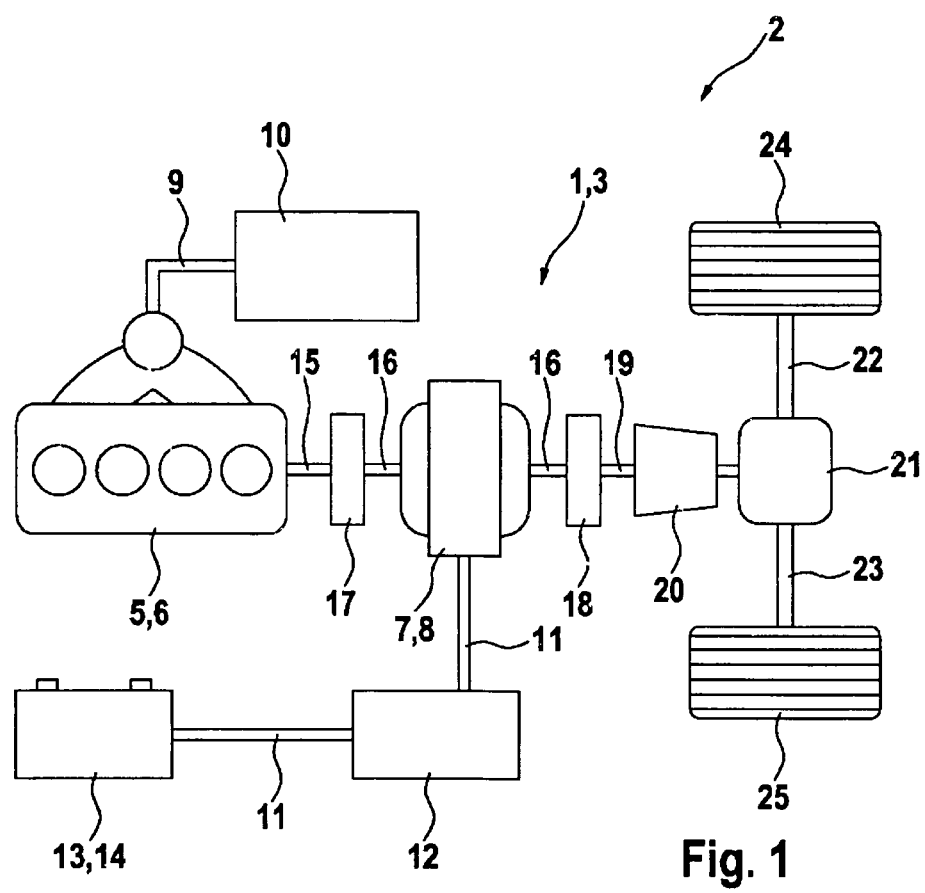
FIG. 1 shows a schematic view of a motor vehicle having a hybrid drive system.

FIG. 1 shows a drive device 1 of a schematically shown motor vehicle 2. Drive device 1 is designed as a hybrid drive device 3. It has two drive devices 4, namely a first drive device 5 in the form of an internal combustion engine 6 and a second drive device 7 in the form of an electric machine 8. Internal combustion engine 6 has a connection 9 to a fuel supply unit 10. Internal combustion engine 6 may thus be operated using fuel from fuel supply unit 10. Electric machine 8 is connected via connection lines 11 and an inverter 12 to an energy storage 13. It is provided in the form of a high-voltage battery 14. Internal combustion engine 6 and electric machine 8 may be coupled to one another in an adjustable way via shafts 15 and 16 and a separating clutch 17. Therefore, when separating clutch 17 is engaged, there is a connection between internal combustion engine 6 and electric machine 8, while when separating clutch 17 is disengaged, both drive devices 5 and 7 are disconnected from one another. In addition, a starting clutch 18, via which a connection is established to a further shaft 19 and thus to a transmission 20, is connected to shaft 16 of electric machine 8. A conversion of the rotational speed or the torque which is generated by internal combustion 6 and/or electric machine 8 is performed in transmission 20 according to a transmission ratio intended by a driver of motor vehicle 2. An output side of transmission 20 is operationally linked to a differential 21, via which shafts 22 and 23 and thus wheels 24 and 25 are drivable. Furthermore, an electronic control unit (not shown) is provided, using which at least internal combustion engine 6 and electric machine 8 may be controlled corresponding to the method according to the present invention for diagnosing an operating status of internal combustion engine 6.

Figure 2:
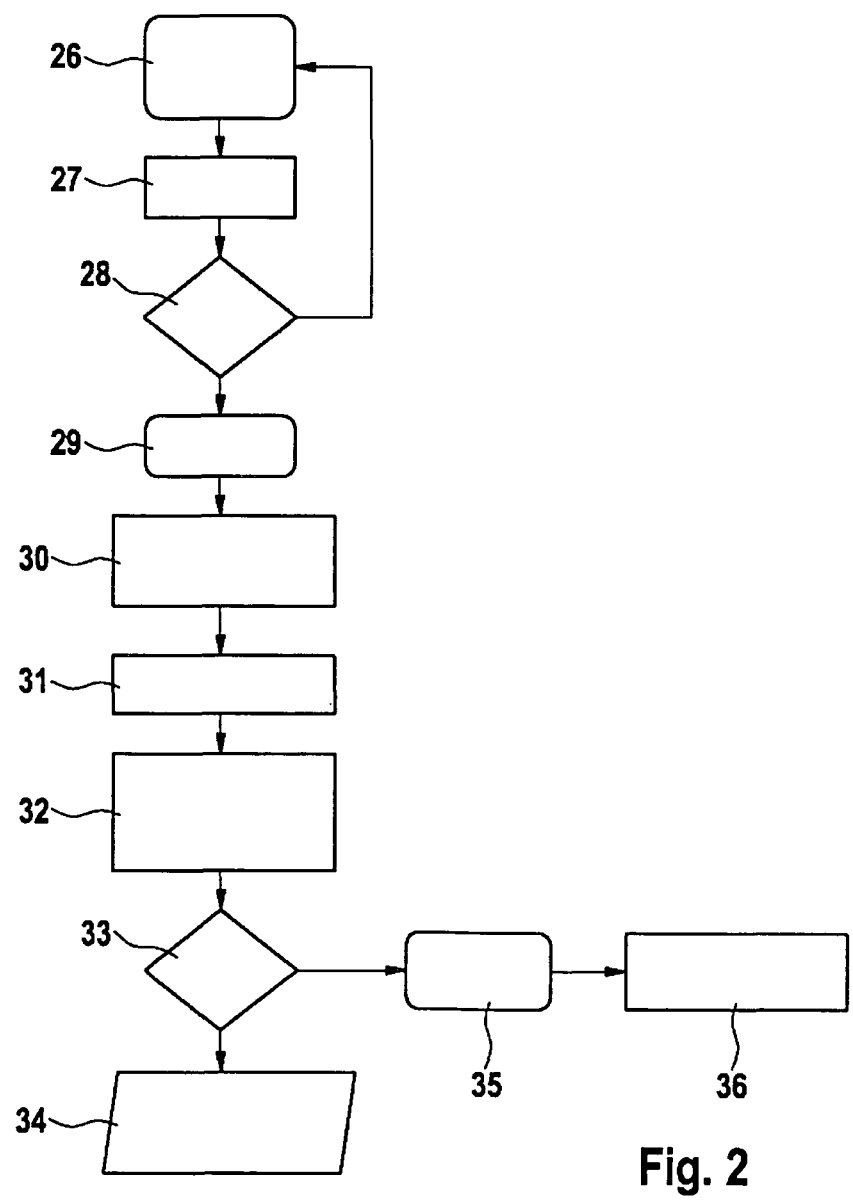
FIG. 2 shows a flow chart of the method for diagnosing an operating status of a drive device of the hybrid drive system.

FIG. 2 shows a flow chart of the method for diagnosing an operating status of the one drive device (internal combustion engine 6). At a starting point 26, the ambient conditions are initially analyzed to establish a possible failure of the one drive device and to trigger an error suspicion signal in this case. Monitoring of the ambient conditions is performed during operation 27, for example, a charge balance of energy storage 13, a signal of an exhaust gas sensor (for example, a lambda sensor), and/or a temperature and/or heat balance of internal combustion engine 6 being analyzed.

If there is a negative charge balance of energy storage 13, although the control unit specifies charging, or if the signal of the lambda sensor indicates excessively lean exhaust gas, although there is no overrun shutoff or cylinder shutoff of internal combustion engine 6, or if the analysis of the temperature/heat balance of internal combustion engine 6 yields the result that the heating is too low (heat is only input into a coolant water circuit by internal combustion engine 6), the error suspicion signal is set. If the error signal is not provided, the sequence jumps back to starting point 26 at a branch 28. Otherwise, the sequence branches into a subprogram 29, in which the diagnosis of the operating status of internal combustion engine 6 is performed. Operation 30 is initially performed, the operating mode "hybrid idle" being requested. This means that starting clutch 18 is disengaged and separating clutch 17 is engaged. Therefore, there is an operational link between internal combustion engine 6 and electric machine 8, but motor vehicle 2 is no longer driven by drive system 1. Subsequently, a system idle rotational speed is specified as the setpoint rotational speed for internal combustion engine 6 and electric machine 8. The system idle rotational speed may be approximately 700 RPM. Both internal combustion engine 6 and also electric machine 8 thus have the same rotational speed, namely the system idle rotational speed. In addition, a neutral charging strategy is set on electric machine 8. The setpoint rotational speeds of internal combustion engine 6 and electric machine 8 are subsequently lowered once again, starting from the system idle rotational speed, for example, by approximately 100 RPM to 200 RPM. A holding torque of separating clutch 17 is subsequently set in such a way that there is no slipping, i.e., no slip, but slipping of separating clutch 17 may occur in the event of unequal setpoint rotational speeds. Within the scope of an operation 31, the setpoint rotational speed of electric machine 8 is subsequently kept constant and that of internal combustion engine 6 is increased, for example, to approximately 1000 RPM. In a subsequent operation 32, an evaluation is performed. A deviation of a P component of internal combustion engine 6 is initially corrected, whereby a throttle valve of internal combustion engine 6 is opened to adapt the actual rotational speed of internal combustion engine 6 to the set setpoint rotational speed. The actual rotational speed of internal combustion engine 6 thus exceeds the actual rotational speed of electric machine 8. Slipping of separating clutch 17 therefore occurs. If internal combustion engine 6 can at least essentially reach the higher setpoint rotational speed (a predetermined tolerance range is permitted), it may be assumed that internal combustion engine 6 is operational. This is evaluated in a branch 33. If the evaluation during operation 32 yields the result that internal combustion engine 6 is operational, i.e., delivers a positive torque, the sequence branches to a program end 34. The diagnosis of the operating status of drive device 5 is thus terminated and the sequence may jump back to starting point 26. In contrast, if internal combustion engine 6 is non-operational, the sequence branches at branch 33 to a subprogram 35, which triggers an error signal. A driver of motor vehicle 2 is subsequently informed about the operating status of drive device 5 within the scope of an operation 36, so that he may take necessary measures, for example, locate a repair shop. Furthermore, separating clutch 17 is completely disengaged, so that motor vehicle 2 is only moved along using electric machine 8. In this way, unnecessary strain of electric machine 8 by non-functional internal combustion engine 6 is prevented. Emergency/replacement measures may also be initiated. For example, a maximum velocity of motor vehicle 2 may be limited, so that a maximum range is ensured.

In an alternative embodiment of the exemplary embodiment, during operation 30, the setpoint rotational speeds of drive devices 4 are set to the system idle rotational speed, a neutral charge strategy is selected on electric machine 8, and a further reduction of the setpoint rotational speeds is performed thereafter, for example, by 200 RPM. Separating clutch 17 is subsequently completely disengaged. During subsequent operation 31, the setpoint rotational speeds of drive devices 4 are kept constant at 700 RPM, for example. If internal combustion engine 6 is operational, its actual rotational speed will correspond to the setpoint rotational speed within a certain tolerance range. If this is not the case, the actual rotational speed deviates from the setpoint rotational speed. This is evaluated during operation 32. However, the predefined tolerance range is taken into consideration in this case. This means that deviations within a comparatively small range are permissible. If internal combustion engine 6 is non-operational, after separating clutch 17 is disengaged, the actual rotational speed of internal combustion engine 6 will drop, since no torque or an excessively small torque is generated thereby. If this is established during operation 32, the sequence branches into subprogram 35 at branch 33. Otherwise, the sequence jumps to program end 34. The statements made with respect to the above-explained embodiment of the exemplary embodiment are referred to with respect to the further procedure.

Figure 3A:
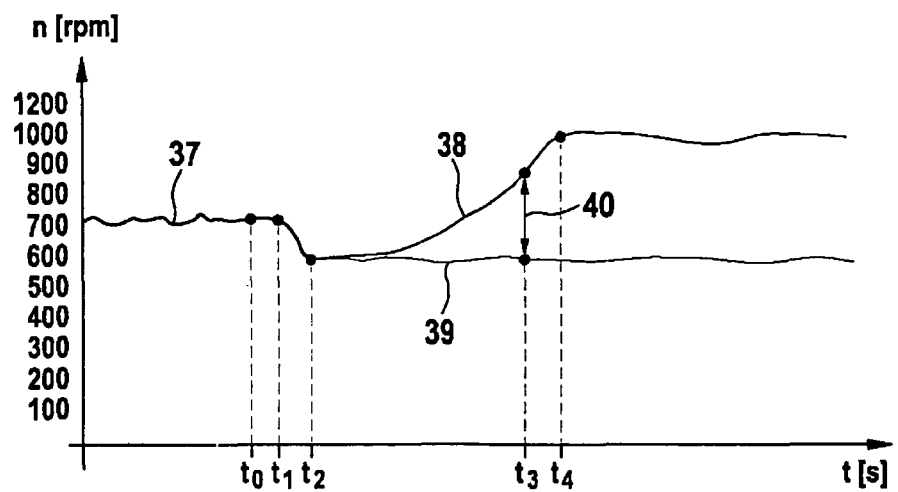
FIG. 3a shows a rotational speed curve of an internal combustion engine and an electric machine during a performance of the method, no error of the internal combustion engine being present.

FIG. 3a shows a rotational speed curve of internal combustion engine 6 and electric machine 8. Time t is plotted in units of seconds on the abscissa, while the ordinate shows rotational speed n in units of RPM. Drive system 1 is in normal operation before a point in time $t_0$. Electric machine 6 is coupled to internal combustion engine 8 via separating clutch 17 and starting clutch 18 is simultaneously engaged, so that motor vehicle 2 is driven using drive system 1. A total drive torque is thus generated essentially jointly by internal combustion engine 6 and electric machine 8. Before point in time $t_0$, the setpoint rotational speeds of internal combustion engine 6 and electric machine 8 are regulated and/or controlled by a higher-order rotational speed regulation/control system (not shown). This means that both drive devices 4 are regulated and/or controlled to the same setpoint rotational speed. The error suspicion signal occurs at point in time $t_0$. This means that the analysis of the ambient conditions of drive system 1 yielded the result that internal combustion engine 6 is possibly non-operational. As a result thereof, from time $t_1$, the setpoint rotational speeds of internal combustion engine 6 and electric machine 8 are reduced, for example, by approximately 150 RPM below the system idle rotational speed. This reduction is completed at point in time $t_2$. Up to point in time $t_2$, the setpoint rotational speeds of internal combustion engine 6 and electric machine 8 essentially have the same curve 37. From point in time $t_2$, internal combustion engine 6 and electric machine 8 are each regulated and/or controlled by a separate rotational speed regulation/control system. This means that the setpoint rotational speed of both drive devices 4 is separately settable. At point in time $t_2$, separating clutch 17 is adjusted, for example, based on the instantaneous setpoint rotational speed, in such a way that no slipping of separating clutch 17 occurs at equal rotational speeds and slipping occurs at different rotational speeds.

At or subsequently to point in time $t_2$, the setpoint rotational speed of internal combustion engine 6 is increased, for example, to 1000 RPM. The rotational speed regulation/control system of internal combustion engine 6 now attempts to adjust the actual rotational speed of internal combustion engine 6 to the set setpoint rotational speed. For example, the throttle valve of internal combustion engine 6 is opened to generate a positive torque. A rotational speed difference builds up at separating clutch 17 due to the rising torque of internal combustion engine 6 in relation to electric machine 8. Separating clutch 17 begins to slip, i.e., there is slip. Subsequently to point in time $t_2$, the rotational speed of internal combustion engine 6 rises according to a curve 38, while the actual rotational speed of electric machine 8 follows a curve 39 and remains essentially constant. For example, the evaluation according to operation 32 is performed between point in time $t_2$ and a further point in time $t_3$, i.e., it is checked whether a rotational speed difference occurs between actual rotational speeds of internal combustion engine 6 and electric machine 8. This is shown as an example for point in time $t_3$ by an arrow 40. At point in time $t_4$, internal combustion engine 6 or rotational speed curve 38 reaches the setpoint rotational speed which was set for internal combustion engine 6. At the latest at this time, the diagnosis of the operating status of internal combustion engine 6 may be terminated, since it is now known that there is a rotational speed difference (see arrow 40) and internal combustion engine 6 is therefore operational. It is advantageous to keep a diagnostic time window, which is between $t_2$ and $t_4$, for example, as short as possible, in order to keep an energy input into separating clutch 17 as small as possible. Subsequently to point in time $t_4$, drive system 1 may change back into normal operation, i.e., for example, to bring the setpoint rotational speeds of internal combustion engine 6 and electric machine 8 in line again and completely engage separating clutch 17. However, this is not shown in FIG. 3a.

Figure 3B:
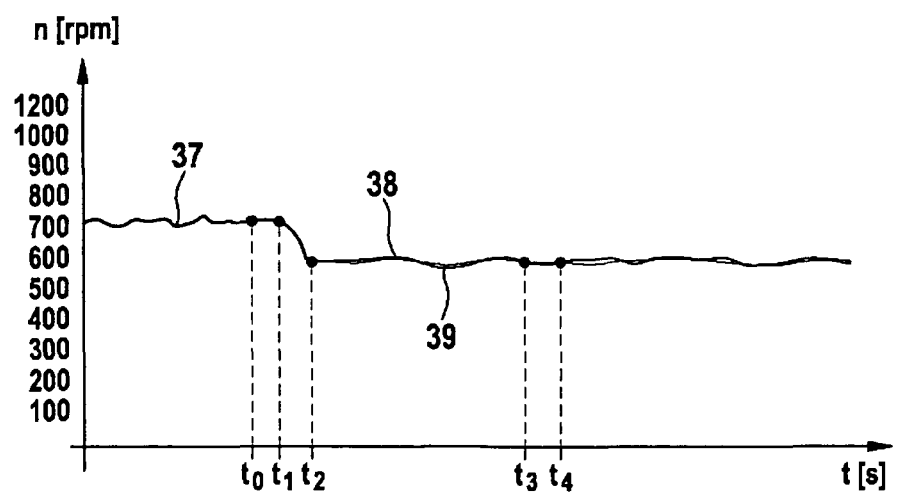
FIG. 3b shows the rotational speed graph from FIG. 3a, an error of the internal combustion engine being present.

FIG. 3b shows rotational speed curves 37, 38, and 39 of internal combustion engine 6 and electric machine 8 for the case in which internal combustion engine 6 is non-operational. The error suspicion signal again occurs at point in time $t_0$, whereby the setpoint rotational speeds of internal combustion engine 6 and electric machine 8 are reduced between points in time $t_1$ and $t_2$. The setpoint rotational speed of internal combustion engine 6 is subsequently set to a higher value. As may be inferred from FIG. 3b, no rotational speed differences ensue between curves 38 and 39. It may be inferred therefrom that internal combustion engine 6 is non-operational. At the latest upon reaching point in time $t_4$, the diagnosis is therefore aborted and the sequence branches into subprogram 35, i.e., the error correction.

Figure 4A:
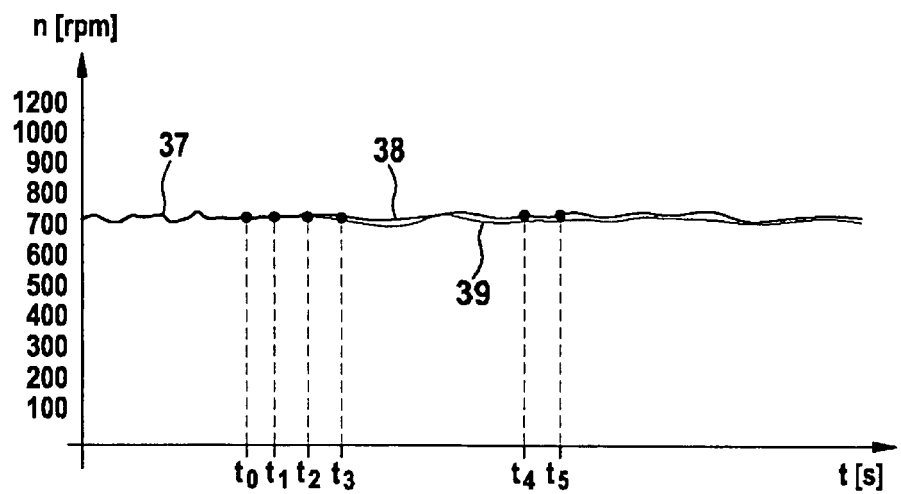
FIG. 4a shows the rotational speed curve of the internal combustion engine and the electric machine during the performance of a second variant of the method, the internal combustion engine being operational.

FIG. 4a shows a further embodiment of the exemplary embodiment, in which separating clutch 17 is completely disengaged to perform the diagnosis. The error suspicion signal also occurs at point in time $t_0$ here, whereby the diagnosis of the operating status of internal combustion engine 6 is initiated. The setpoint rotational speeds of internal combustion engine 6 and electric machine 8 are set to the system idle rotational speed, for example, 700 RPM. A changeover is also performed here from the higher-order rotational speed regulation/control system to the rotational speed regulation/control systems assigned to drive devices 4. For example, electric machine 8 reaches the setpoint rotational speed at point in time $t_1$, while internal combustion engine 6 reaches the setpoint rotational speed at point in time $t_2$. At point in time $t_3$, separating clutch 17 is disengaged to perform the diagnosis. Between points in time $t_3$ and $t_4$, i.e., in the diagnostic time period, rotational speed curves 38 and 39 are evaluated. If internal combustion engine 6 is operational, no rotational speed difference ensues between internal combustion engine 6 and electric machine 8, since the setpoint rotational speeds coincide and the actual rotational speeds are adjusted accordingly. Thus, if it is established between $t_3$ and $t_4$ that the actual rotational speeds of internal combustion engine 6 and electric machine 8 essentially coincide, it is assumed that internal combustion engine 6 is operational. The diagnosis is terminated at point in time $t_5$.

Figure 4B:
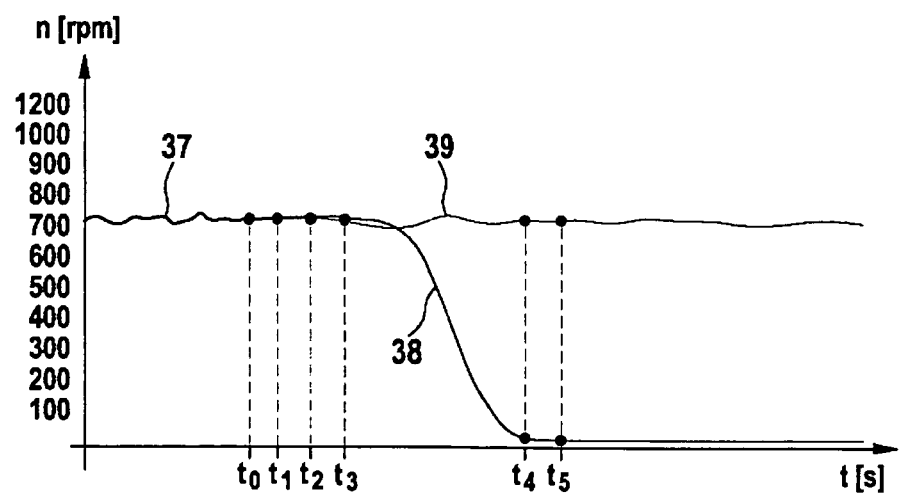
FIG. 4b shows the rotational speed graph from FIG. 4a, an error of the internal combustion engine again being present.

FIG. 4b shows rotational speed curves 37, 38, and 39 for the case in which internal combustion engine 6 is non-operational. The time sequence corresponds to that described on the basis of FIG. 4a. From the disengagement of separating clutch 17 to point in time $t_3$, rotational speed curves 38 and 39 differ from one another, in contrast to the example shown in FIG. 4a, since internal combustion engine 6 is non-operational and therefore cannot maintain the setpoint rotational speed. In contrast, the actual rotational speed drops according to rotational speed curve 38. This is again established during the diagnostic window between points in time $t_3$ and $t_4$. The diagnosis may therefore be terminated at point in time $t_5$, with the result that internal combustion engine 6 is non-operational. Suitable measures may subsequently be taken, for example, informing the driver and/or changing over to an emergency operation.

What is claimed is:

1. A method for diagnosing an operating status of at least one drive device in a motor vehicle having two drive devices configured as an electric machine and an internal combustion engine, and at least one separating clutch configured to adjustably couple the two drive devices, the method comprising:
setting setpoint rotational speeds of the two drive devices to predetermined setpoint values;
determining the operating status of the at least one drive device by evaluating a relative rotational speed difference in between the actual rotational speeds of the electric machine and the internal combustion engine; and
setting a holding torque of the separating clutch in such a way that (i) no slipping of the separating clutch occurs in the event of equal rotational speeds between the two drive devices, and (ii) slipping occurs in the event of different rotational speeds between the two drive devices.

2. The method as recited in claim 1, wherein the setpoint rotational speed for each of the two drive devices is set by a respective first-level rotational speed control system assigned to each of the two drive device.

3. The method as recited in claim 2, wherein one of (i) each first-level rotational speed control system is set by a respective second-level rotational speed control system during normal operation, or (ii) each of the two drive devices is regulated with the aid of the respective second-level rotational speed control system.

4. The method as recited in claim 2, wherein the rotational speeds of the two drive devices are reduced before the diagnosis is performed.

5. The method as recited in claim 2, wherein the setpoint rotational speed of the at least one drive device is one of increased or reduced relative to the other drive device.

6. The method as recited in claim 2, wherein the at least one separating clutch is disengaged to perform the diagnosis.

7. The method as recited in claim 2, wherein an idle rotational speed is used as the setpoint rotational speed.

8. The method as recited in claim 2, wherein the method is initiated after an occurrence of an error suspicion signal indicating a potential error in the motor vehicle.

9. The method as recited in claim 2, wherein the error suspicion signal is generated as a result of at least one of a charge balance of an energy storage, a signal of an exhaust gas sensor, an analysis of a temperature balance of the at least one drive device, and an analysis of a heat balance of the at least one drive device.

10. The method as recited in claim 2, further comprising a diagnosis of the separating clutch, wherein one of: a diagnosis of the separating clutch is performed as a first step of the method; or the diagnosis of the separating clutch is temporarily stopped during the performance of the method.

11. The method as recited in claim 2, wherein a result of the diagnosis is indicated to a driver of the motor vehicle.

12. A diagnostic device for diagnosing an operating status of at least one drive device in a motor vehicle having two drive devices configured as an electric machine and an internal combustion engine, and at least one separating clutch configured to adjustably couple the two drive devices, the diagnostic device comprising:
- an arrangement for setting setpoint rotational speeds of the two drive devices to predetermined setpoint values;
- an arrangement for determining the operating status of the at least one drive device by evaluating a relative rotational speed difference in between the actual rotational speeds of the electric machine and the internal combustion engine; and
- an arrangement for setting a holding torque of the separating clutch in such a way that (i) no slipping of the separating clutch occurs in the event of equal rotational speeds between the two drive devices, and (ii) slipping occurs in the event of different rotational speeds between the two drive devices.

13. A drive system of a motor vehicle, comprising:
 two drive devices configured as an electric machine and an internal combustion engine;
 at least one separating clutch configured to adjustably couple the two drive devices; and
 a diagnostic device configured to diagnose an operating status of at least one of the two drive devices by:
  setting setpoint rotational speeds of the two drive devices to predetermined setpoint values;
  determining the operating status of the at least one drive device by evaluating a relative rotational speed difference in between the actual rotational speeds of the electric machine and the internal combustion engine; and
  setting a holding torque of the separating clutch in such a way that (i) no slipping of the separating clutch occurs in the event of equal rotational speeds between the two drive devices, and (ii) slipping occurs in the event of different rotational speeds between the two drive devices.

* * * * *